Oct. 6, 1964   H. C. SAUER   3,152,204
METHOD AND APPARATUS FOR CURING ENDLESS BELTS
Filed June 9, 1960   7 Sheets-Sheet 1
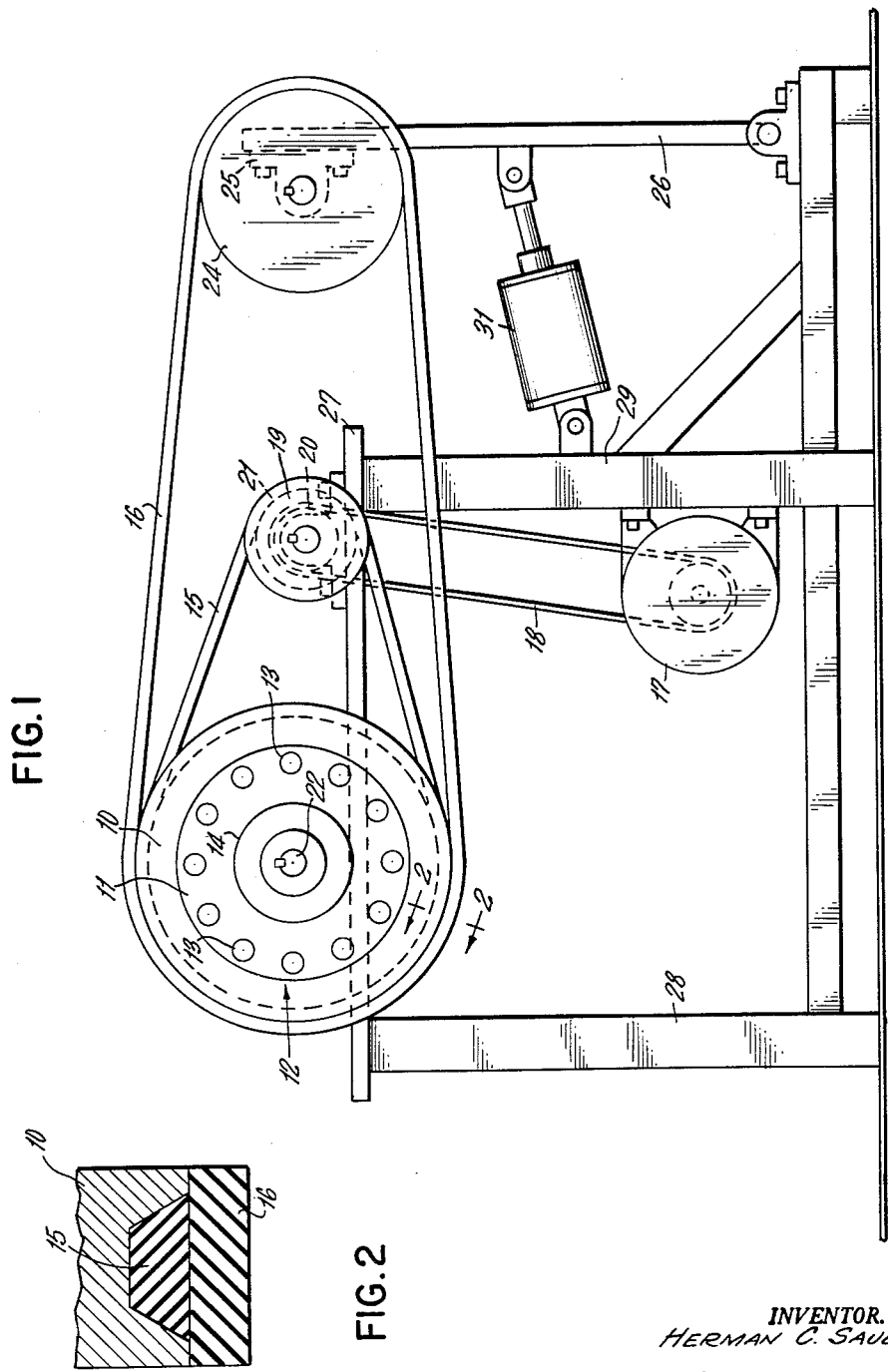
INVENTOR.
HERMAN C. SAUER
BY
ATTORNEY INVENTOR.
HERMAN C. SAUER
BY Paul H Blaustein
ATTORNEY INVENTOR.
HERMAN C. SAUER
BY Paul H Blaustein
ATTORNEY

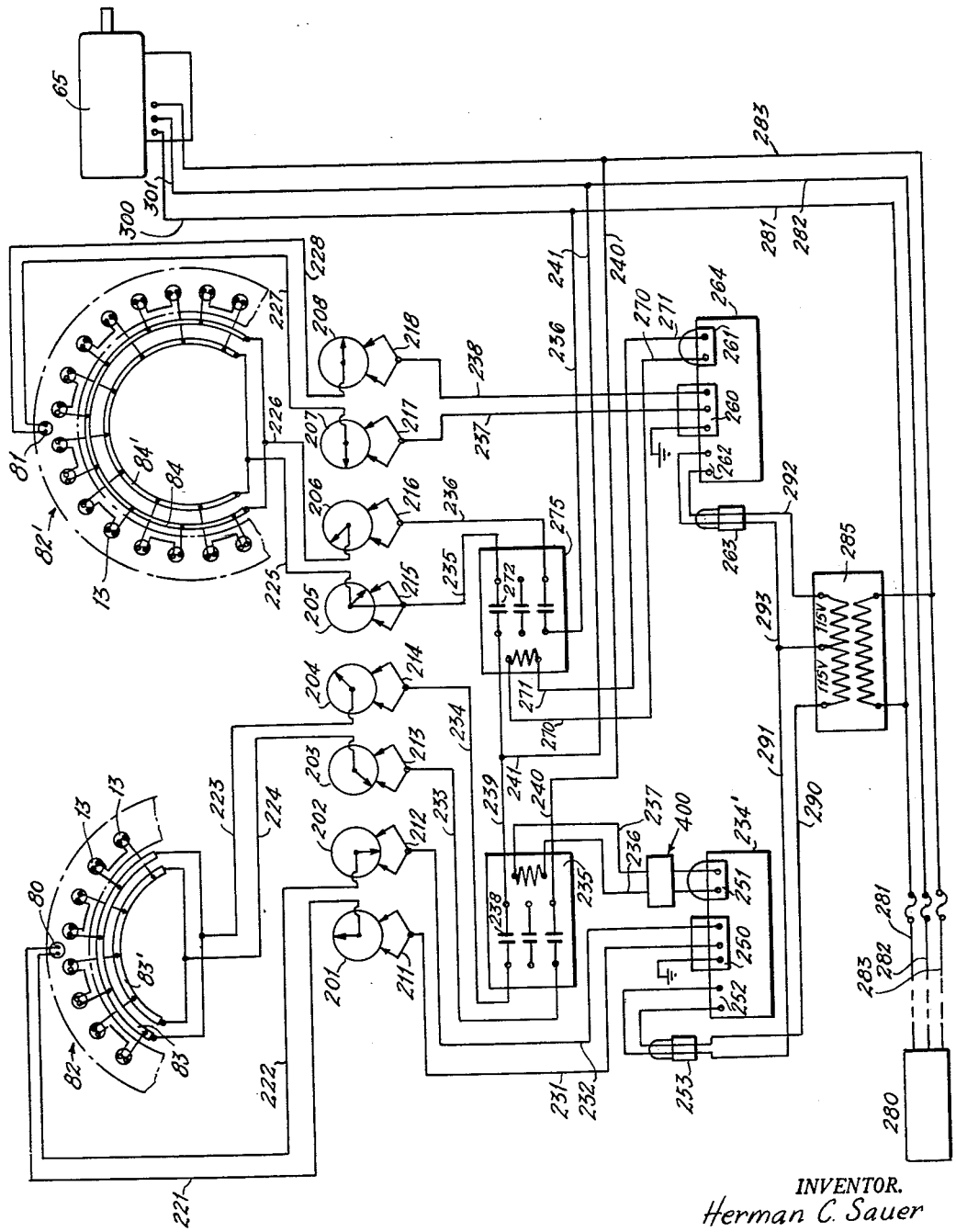

Oct. 6, 1964  H. C. SAUER  3,152,204
METHOD AND APPARATUS FOR CURING ENDLESS BELTS
Filed June 9, 1960  7 Sheets-Sheet 7
FIG. 12A
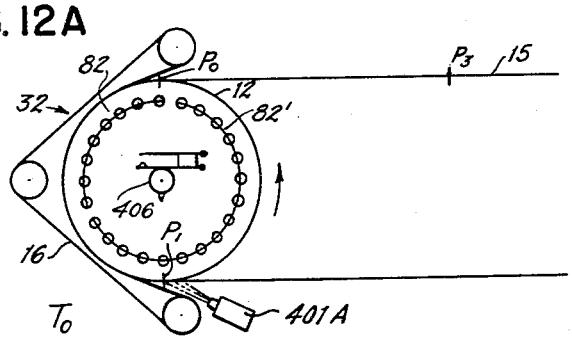
FIG. 12B
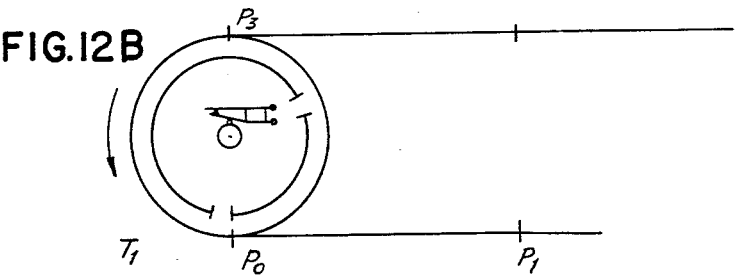
FIG. 12C
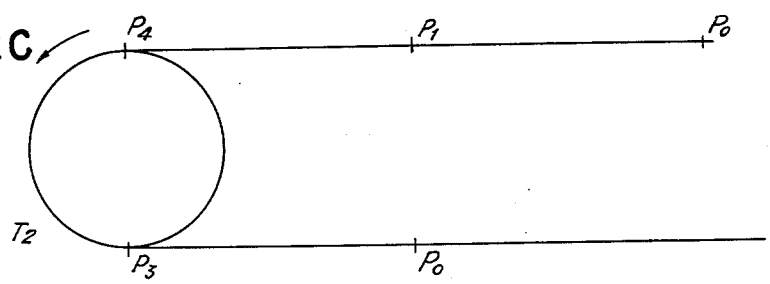
FIG. 11
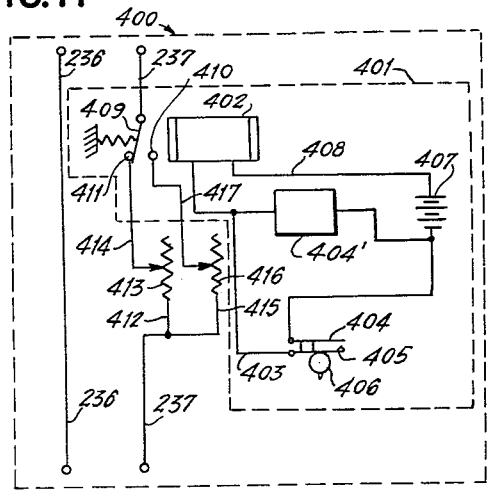
FIG. 12D
INVENTOR.
Herman C. Sauer
BY
Paul H. Blaustein
ATTORNEY

United States Patent Office 3,152,204
                  Patented Oct. 6, 1964

3,152,204
METHOD AND APPARATUS FOR CURING ENDLESS BELTS
Herman C. Sauer, Ambler, Pa., assignor to United States Rubber Company, New York, N.Y., a corporation of New Jersey
Filed June 9, 1960, Ser. No. 35,013
6 Claims. (Cl. 264—231)

This invention relates to a process and apparatus for curing rubber belts while they are in motion and may aptly be described as a dynamic curing method and apparatus. It finds particular utility in the curing of very long endless belts which heretofore could not be cured on conventional circumferential molds without incurring unreasonable mold costs, large diameter vulcanizers and expensive transfer equipment.

The mode of curing rubber belts has been found to be one of the most important factors in producing high quality items. This is especially so when the belts are to be used in multiples for transmitting great loads and where uniform belt length, uniform elongation and tensile strength are required for satisfactory performance. Any defect which might occur during the curing process will greatly reduce the effectiveness and service life of the belt. In particular, it has been found that when the belt is cured while it slowly moves into the curing area where heat and pressure are applied gradually, greater adhesion is achieved between the various rubber, tensile member, and fabric jacket components of the belt. The process and apparatus of this invention provide a very slow controlled cure of the moving belt and the motion of the belt tends to simulate actual operation.

In particular, this invention not only uses a predetermined control of the temperature of the heat applied to the rubber belt particles during cure and shortly thereafter, but also utilizes a resilient flexible and compressible elastomeric butyl pressure band to keep the belt elements tightly together. This band comprises an elastomeric material, such as cured butyl rubber (which, as is well-known, is a rubbery copolymer of a major proportion of isobutylene and a minor proportion of a conjugated diolefin containing from 4 to 6 carbon atoms per molecule), or any heat resisting compressible resilient material of substantial thickness. By utilizing this particular type of band, the belt is allowed to cure from the bottom and sides toward the center and top surface which causes the belt to gradually take on the desired shape in the mold cavity with the least distortion of the tension members.

The process herein described also eliminates over-cures or double-cures of certain portions of the belt which is impossible to avoid in press curing. Over-curing reverses the rubber to the state of becoming soft and spongy after the rubber has reached the cured state by the application of additional heat which also tends to burn the life out of the cord tension members and belt jackets. Rubber which is undercured, that is, rubber which does not reach the cured state, is characterized by a lack of adhesion, insufficient hardness and general state of porosity. A double cure is also an over-cure, and results when rubber is subjected to double or two cures. Over-cures are just as objectionable as under-cures, and to avoid this state, heat and pressure must be applied uniformly and constantly over the entire belt length and close pressure-heat control for the full curing cycle is a necessity.

An object of this invention is therefore to provide a pre-determined temperature control of the cure in association with the use of a substantially heat resistant non-conductive pressure band while curing a moving belt.

Another object of this invention is to provide an improved process and apparatus for curing relatively long belts.

A further object of this invention is to provide a cure of belts under conditions which more closely approximate normal operation of the belt to effect a dynamic cure thereof and to eliminate any over, double or under cures of particular sections of the belt.

Other objects and advantages of this invention will become apparent from the following description taken in connection with the accompanying drawings, wherein are set forth by way of illustration and example certain embodiments of this invention.

FIGURE 1 is a schematic view representing the invention;

FIGURE 2 is a cross-section of one type of belt and mold cavity on which the invention may be practiced;

FIGURE 10 is a circuit diagram of the temperature control;

FIGURE 11 is a circuit diagram of an auxiliary element of the temperature control circuit used to adjust the temperature at preselected regions on the curing drum; and FIGURES 12 A–D illustrate the process in operation.

Figure 3:
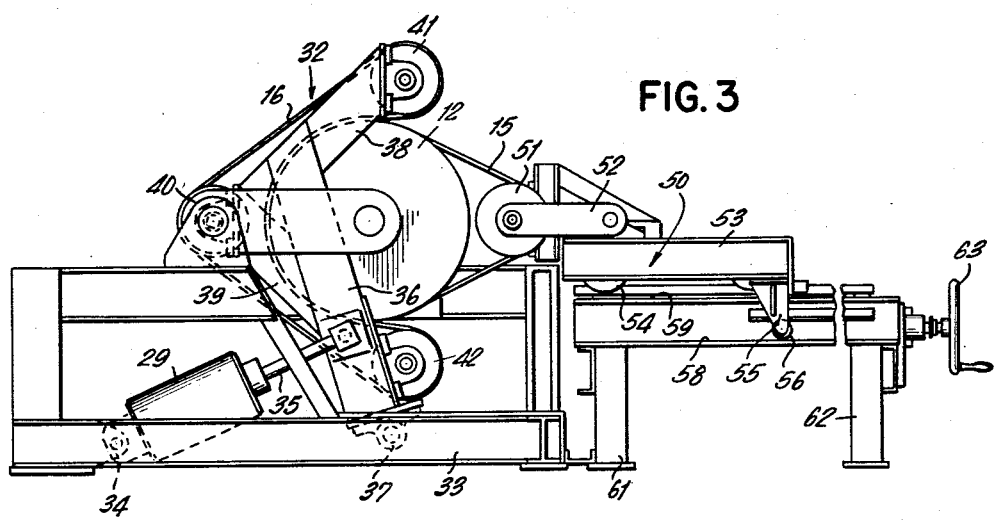
FIGURE 3 is a side view of the apparatus of the invention.

Referring now to the drawings, there is shown in FIG. 1 a diagrammatic view of the dynamic curing machine which is useful in explaining the principles of this invention. A curing mold 10 has a number of equally spaced transversely positioned V-shaped mold cavities which are adapted to receive the V-belt which is to be cured. It should be noted that the shape of this cavity in the mold may be changed depending upon the type of belt which is to be cured by providing another mold. A curing ring 11 is positioned radially inwardly of the mold 10 and is spaced adjacent thereto in order to provide the necessary heat for curing. This curing ring contains a number of cartridge heaters 13 which are suitably spaced close to the periphery of the curing ring. The curing ring as shown surrounds an annular plastic hub core 14 which is disposed to prevent heat loss.

The uncured belt 15, is positioned in the cavities of mold 10 and in the respective peripheral grooves 21 of pulley 19 which are adapted to receive this belt. Rotation is imparted to the whole assembly by means of a driving device shown as a ratio motor at 17. Motion is transmitted by the drive belt 18 to pulley 19 by running the drive belt 18 over the pulley 20 which is concentrically coupled to pulley 19. An endless, low heat-conductive butyl pressure band 16 is placed over the uncured belt which is now in the mold cavity and is stretched over a supporting drum 24 which is mounted on an arm 26 by means of bearing 25 and bracket assembly. The curing drum 12 is mounted on platform 27 through shaft 22 by means spaced rearwardly of the drum (not shown). The platform 27 is supported by frames 28 and 29 which may be suitably affixed to any base member by conventional methods. The pressure band 16 is held in tension by the use of hydraulic or air cylinder 31 means, which exerts an outward force on arm 26 which in turn acts to extend the pressure band 16 by pushing the drum 24 in an outward manner.

If desired, the pressure band 16 may be warmed before and during operation by placing a radiant heating element adjacent therewith.

FIG. 2 shows one section of the curing mold 10. The mold 10 receives the uncured belt 15 which is pressed into the mold cavity by the heat resistant pressure band 16. The shape of the mold cavity depends upon the type of belt which is to be cured.

Referring now to FIG. 3 there is shown the general assembly of the preferred embodiment of the dynamic curing machine. The major components as shown therein are the curing drum 12, the uncured belt 15, the pressure band assembly 32 and the take-up assembly 50.

A main horizontal support 33 may be secured to the floor on which the machine is to be positioned by any suitable means. The expanding cylinder 29 is fixedly journaled at 34 to the support. The cylinder 29 has an extending piston rod 35 which engages an arm 36 pivotally mounted at 37 to the main support 33. Thus when the cylinder 29 expands the piston rod is extended which thereby pivots arm 36. The pressure band assembly 32 is connected to the main support 33 by means of arm 36 which is rigidly secured to interconnecting members 38 and 39. These members are held in alignment by the shafts of pulleys 40, 41 and 42 which in turn rotate in pillow block bearings. The pulley 40 not only serves to connect members 38 and 39 but also has an outer peripherally grooved surface adapted to receive the pressure band 16. This band is entrained over pulleys 40, 41 and 42 and has sufficient length to follow a reverse path parallel to the band section between 41 and 40, and 40 and 42 respectively as the rear surface of the curing drum provides pressure thereagainst. It may be observed that the amount of pressure applied by pressure band 16 on the uncured belt 15 is controlled by the force which is exerted by cylinder 29 against piston rod 35.

The uncured belt 15 remains in tension while it is rotating during the curing operation by means of the take-up assembly 50. The take-up assembly comprises a peripherally grooved pulley 51 which carries the belt 15 and which is connected to a carriage 53 by connecting means 52 comprised of conventional bearings, shaft and an arm. The grooves in this pulley are in alignment with those in the curing drum mold cavity. The carriage has wheels 54 which ride on guide rod 59 and is held in horizontal position by bracket 55 which carries rollers 56. The rollers ride on guide rods 58. The entire carriage-guide rod assembly is supported by posts 61 and 62. The carriage is conventional and is moved by rotation of a hand wheel 63 which may be connected to the carriage by a screw feed which is not shown. If desired automatic means may be utilized instead of the hand wheel-feed screw assembly.

Figure 4:
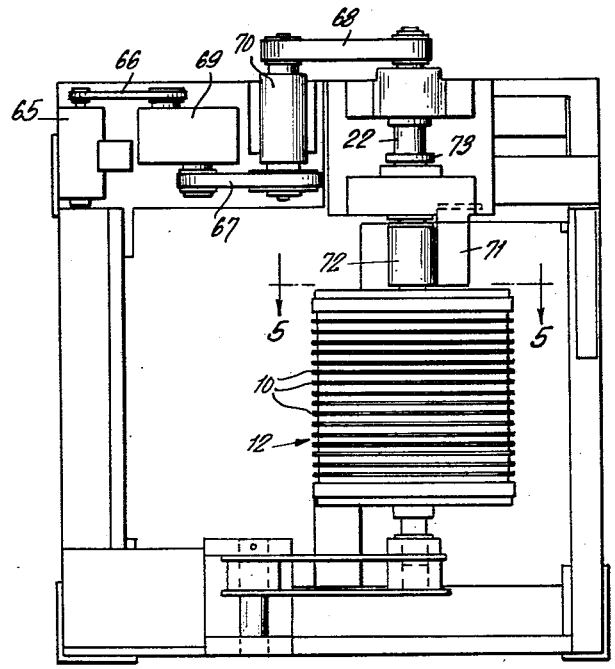
FIGURE 4 is a top view of the apparatus of FIGURE 3.

FIG. 4 is a top view of the general assembly shown at FIG. 3, omitting the belt take-up (tension) assembly. The curing drum 12 comprises a plurality of transversely spaced mold cavities in which uncured belts 15 may be placed. The entire drum 12 is mounted on a shaft 22 and other supporting means not shown. Shaft 22 is connected to a drive motor 65 through a transmission system comprising a number of motion transmitting belts 66, 67 and 68 which are coupled to speed reducers 69 and 70 in a conventional manner. Mounted at one end of the drum 12 is a slip ring assembly 72 and positioned adjacent thereto is a brush assembly 71. It is through this brush and slip ring assembly that the electrical current is supplied to activate heating cartridges 13 which have heretofore been shown at FIG. 1 and in the preferred embodiment are shown in FIG. 5.

Figure 5:
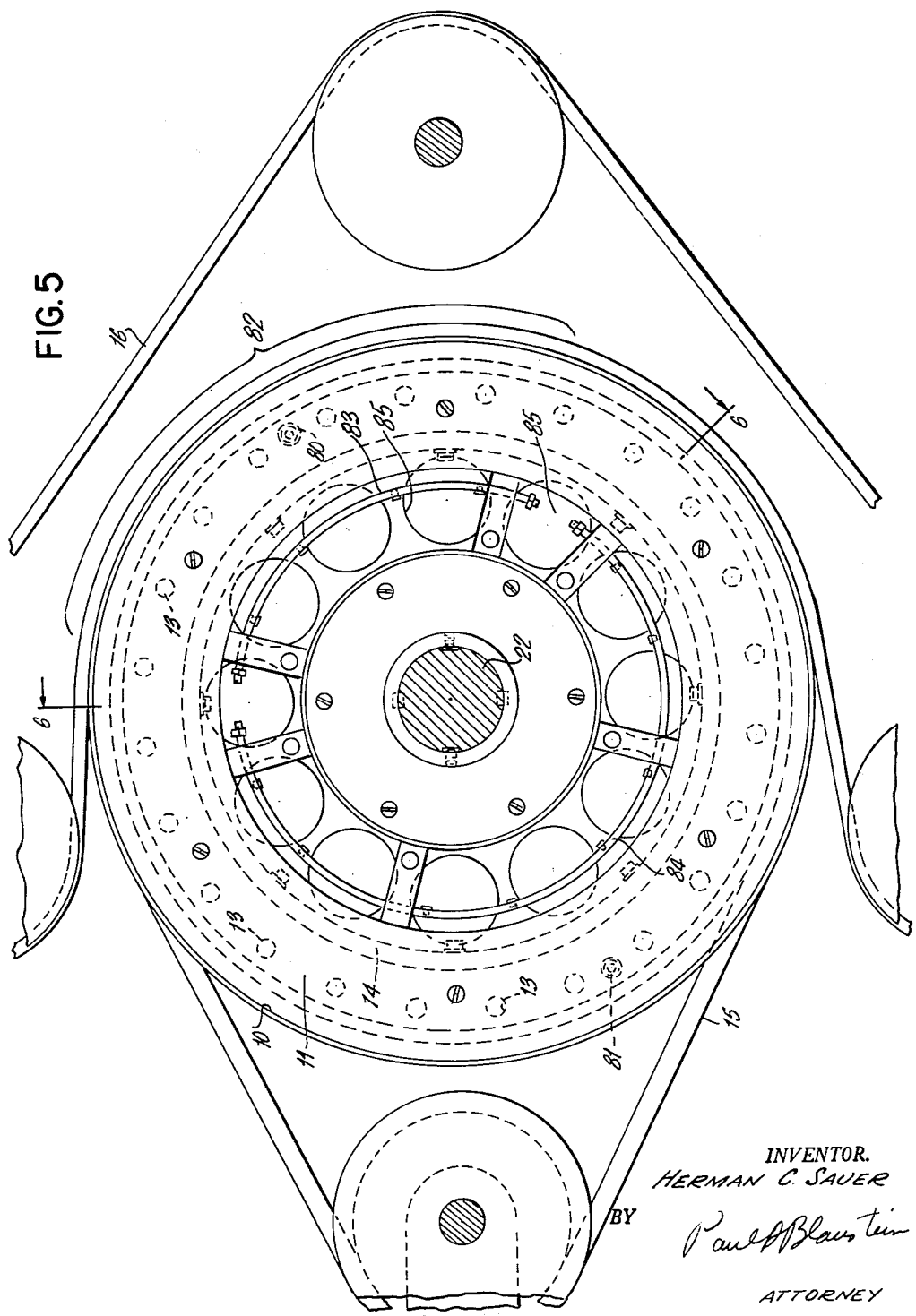
FIGURE 5 is a sectional view taken along 5—5 of FIGURE 4 showing the construction of the curing drum in further detail.

FIG. 5 is a sectional view showing the construction of drum 12. The heat-resistant pressure band 16 and an uncured belt 15 are in position with belt 15 being in tension and band 16 being fixed thereagainst so as to provide the required pressure. The outer periphery of the drum is grooved to the shape of belt size thus forming the mold cavities which receive belts 15. Adjacent thereto is the heater ring 11 having a plurality of cartridge heatres 13 which provide the heat for curing. In the particular embodiment shown, thereare twenty-four cartridge heaters of conventional construction, each heater having an insulated core on which is wound a resistance element composed of nickel chromium alloy. This element is connected to two terminals which are embedded in one end of the core. Magnesium oxide powder is used as the insulating material between the heating element and the casing, or sheet. This type of cartridge heater is well known in the art and is not per se considered to be part of this invention. Positioned diametrically within the curing ring 11 are temperature probes 80 and 81 which monitor the temperature of the ring. These probes are of the thermistor type and are connected to the control system as will be shown hereinafter.

The twenty-four heating elements are divided into two banks, one bank containing eight cartridges on the right side of FIG. 5 as designated by the numeral 82; the remaining sixteen cartridges form the other bank. Current for the eight bank of cartridges 82 is supplied through a curved bus bar 83 which is secured to the drum by means of insulating clamps. Actually bus bar 83 is only one of two bus bars which are used to supply current to the cartridges 82, the other bus bar being positioned directly behind bus bar 83 and cannot be shown in this figure. Current for the sixteen bank of cartridges is supplied through bus bar 84 which also has a second bus bar attached rearwardly. Thus it is seen that the current which is supplied to the eight bank and the sixteen bank may be unequal and this feature is utilized in the control system.

At the innermost surface of the curing ring, a plastic heat insulating surface 14 (FIG. 6) is affixed in order to retain the heat in the curing ring. In order to prevent heating of shaft 22, a number of large apertures 85 allow the heated air to flow therethrough and into the outer space. The entire drum 12 is rigidly fixed to a central shaft 22 by means to be described.

Figure 6:
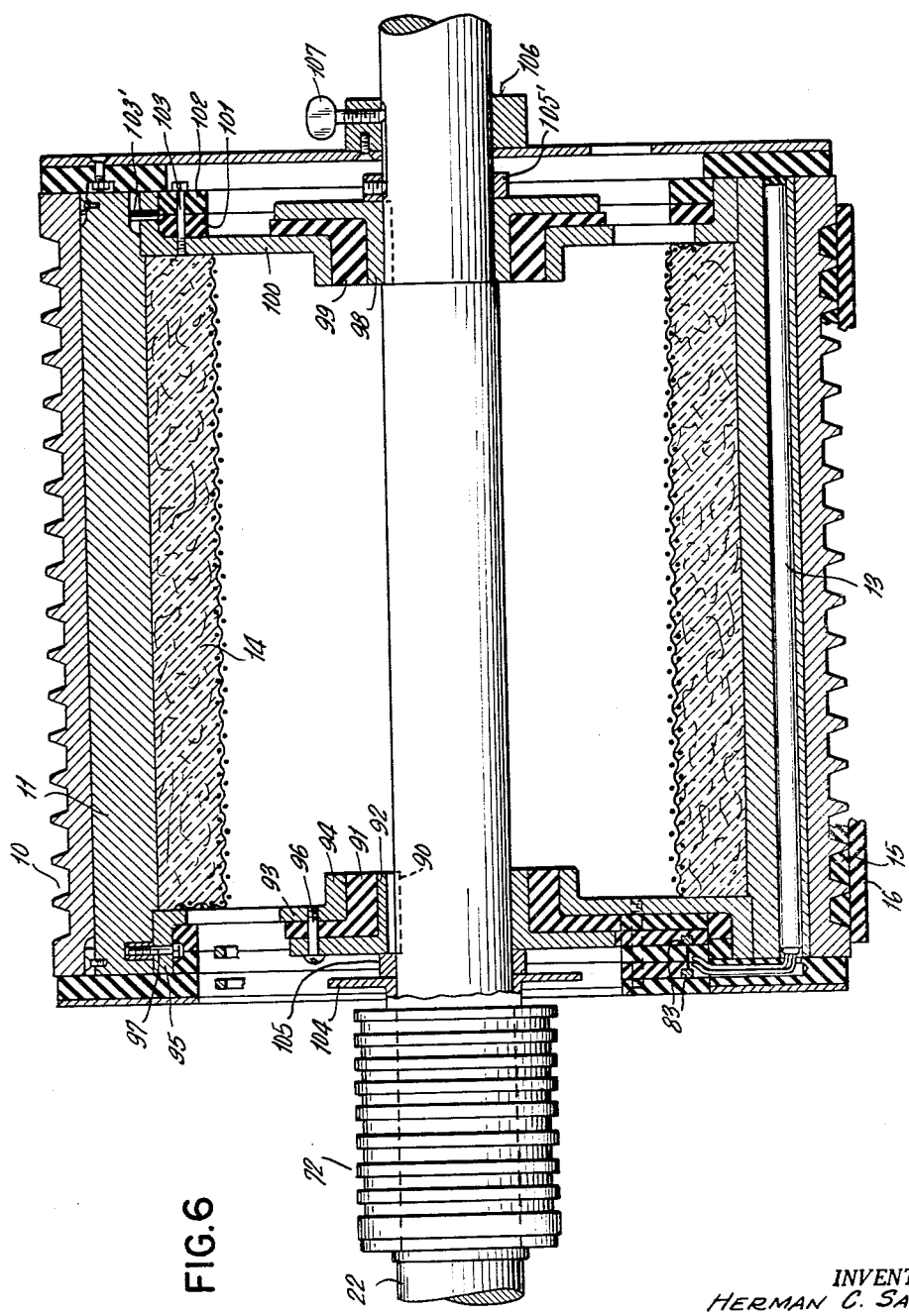
FIGURE 6 is a partly sectional view taken along 6—6 of FIGURE 5 showing the interior of the curing drum.

In FIG. 6 there is shown the details of the interior of the drum and the mounting construction. On the left bottom side of the drum, there is shown the uncured belt 15 and the pressure band 16. The mold is shown at 10 and the curing ring at 11. The insulating ring is adjacent the heater ring 11 and is shown as number 14. Members 10, 11 and 14 are fixed to shaft 22 through a number of connecting elements. Keyed to the shaft at the inner hub surface is a key element 90 which is connected to an inner hub member 92. Annularly encompassing inner hub 92 is an inner insulating hub 91 which is connected to a annular ring 93 having outwardly 95 and inwardly 94 extending flange sections. The inner annular flange of 93 is connected to the hub members 91 and 92 by means of a bolt 96 while the outwardly extending flange is connected to the curing ring through bolt 97.

The other end of the shaft carries members 10, 11 and 14 by means of an outer hub 98 keyed to shaft, an outer insulating hub 99 and an annular member 100. Insulating rings 101 and 102 are fixed concentric with the shaft and adjacent the annular member to prevent heat loss and a bolt 103 fastens the insulating ring to the annular member 100. Annular member 100 drives the outer drum members by means of a driving pin 103 in the outer ring of 100. The commutator assembly 72 is positioned adjacent the inner hub section and is kept separate by means of insulating flange 104 (which is part of the commutator assembly) and collar 105.

The eight heater bus 83 has wires which extend in a plane perpendicular to the shaft and connected to a cartridge 13. A retaining collar 105' is positioned on the opposite end of the shaft and together with collar 105 keep the drum securely in place. Thumb screw 107 keeps the insulated end plate 106 in place against the end of mold 10 and ring 11.

Figure 7:
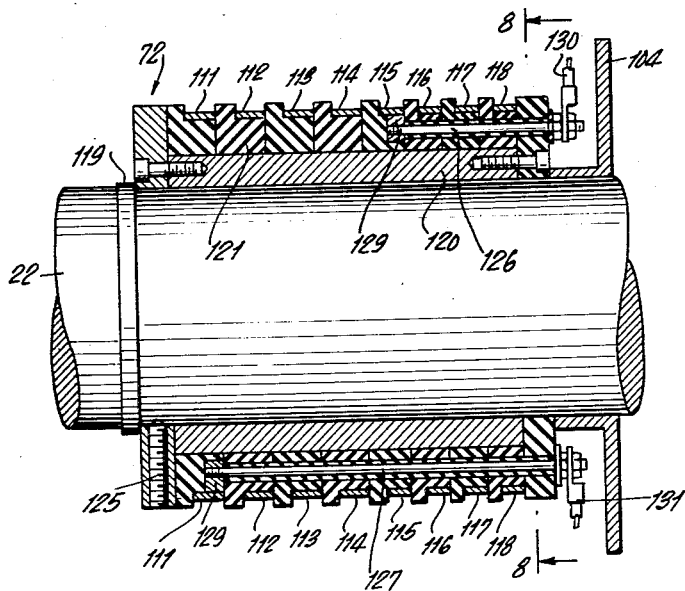
FIGURE 7 is a cross sectional view of the commutator of the invention.

Referring now to FIG. 7, the commutating assembly 72 is fastened to shaft 22 through suitable screw connections 125 and by means of the shoulder 119 and insulating flange 104 which has been described in connection with FIG. 6. Positioned on the commutator assembly are eight annular contact elements or slip rings 111–118. Remembering that there were two banks of heater cartridges and that there were two temperature probes, it is necessary to have separate circuits for four electrical elements necessitating eight connections. Each of the contact elements 111–118 is connected by means of elements described below to its respective terminal which in turn is fastened to one of the lead wires running to a heater bus ring 83 or 84. Surrounding shaft 22 is an insulating tube 120 carrying insulating rings 121 upon which are pressed slip rings 111–118. Each insulating ring is cut out to receive a contact block 129 (of conductive material) and connecting screws 126 and 127. Such screws are threaded into the contact blocks 129 which are bonded to the slip rings 111–118 to provide the necessary electrical contact between the contacting brushes 140 (FIG. 8) and the lead wire terminals 130 and 131. In the particular embodiment, slip ring 115 is connected to screw 126 through contact block 129. A similar construction is shown for connecting screw 127 which eventually makes contact with slip ring 111. Connecting screws 126 and 127 are fastened respectively to lead wires 130 and 131, each of which in turn connects with one of the electrical bus rings 83 or 84. Inasmuch as the entire assembly rotates as one unit there is no problem as to the manner of connecting the lead wires.

Figure 8:
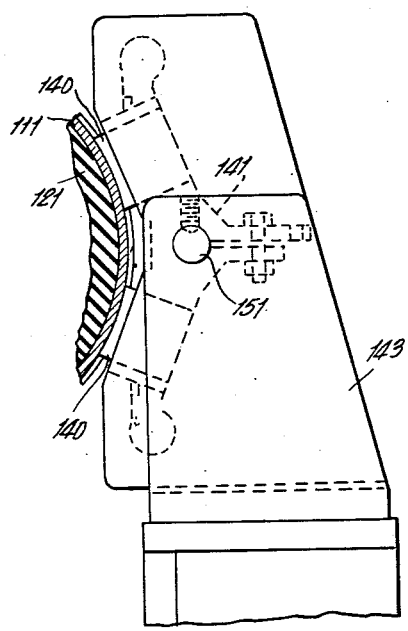
FIGURE 8 is a partly sectional view of the brush, brush contact and brush holder.
Figure 9:
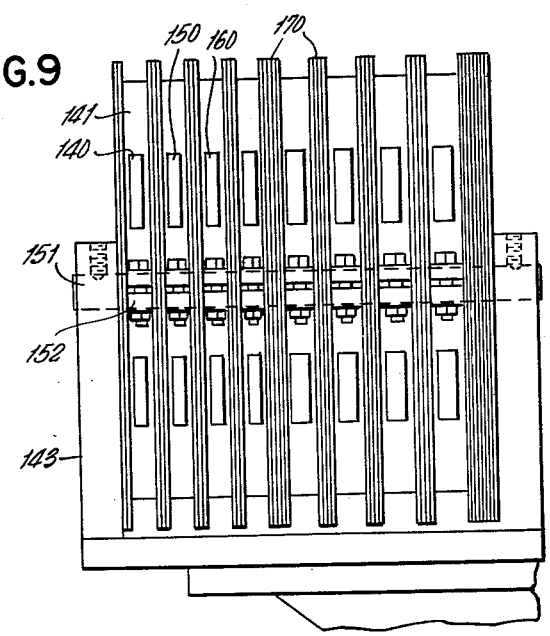
FIGURE 9 is a side view of the brush assembly of FIGURE 8.

Lying in the same diametric plane as the contact elements 111 through 118, are brush assemblies which are adapted to contact each of the slip rings. As shown in FIG. 8 slip ring 111 contacts two brushes connected together denoted as numerals 140. FIGURE 9 shows an assembly of brushes, 140, 150, 160 etc., one for each slip ring 111–118. Brushes 140, are circumferentially spaced and are carried by brush mountings 141 which are secured to the brasket rod 151 by bolting means 152. Bracket rod 151 carrying the eight brush mounts is itself supported between end plates of a fitting 143. Brush mounts 141 are associated with each of the brushes 140, 150 and 160 (as shown in FIG. 9) and each brush and brush mount is kept separate by the use of insulating spacers 170. The entire brush assembly is then fixed in position adjacent the slip ring assembly 72 as shown in numeral 71 in FIG. 4.

The circuitry of the temperature control system is shown in FIG. 10. The heating ring 11 (FIG. 5) comprises two separate temperature segments each of which is independently controlled. The control of the ring temperature is not only accurate but may be varied at different locations along the circumference of the curing ring depending on the current supplied to each temperature segment so as to provide a precise cure and avoid over or under curing.

In FIG. 10 the eight bank of cartridges 82 which had been shown in FIG. 5 is now shown separated from the sixteen bank, denoted as 82'. Each of the cartridges 13 of the eight bank 82 is connected in parallel to bus bars 83 and 83'. The power for these cartridges is supplied over power wires 223 and 224 which connect to slip rings 203 and 204. Such slip rings may be the same slip rings that had been shown as for example 111 and 112 of FIG. 7. Rings 203 and 204 connect respectively to brushes 213 and 214 which in turn connect to wires 233 and 234. Wires 233 and 234 enter into magnetic contactor means 235 having contact elements shown as 238. When contact elements 238 are closed wires 233 and 234 connect to wires 239 and 240, wire 239 becoming 241 and eventually connecting to power wires 282 and 283 of the voltage source 280. Thus the control of the temperature in the curing ring is maintained by a conventional control device which effectively connects or disconnects the voltage source 280 from the bus bars 83 and 83' via the magnetic contactor means 235. When the contact elements 238 are closed the voltage source is connected to the bus bars, but when the contacts are open the voltage source is disconnected.

In order to provide a means for opening and closing the voltage source dependent upon a temperature of the curing ring, a temperature probe 80 is fixed in position in the curing ring. Temperature probe 80 connects to wires 221 and 222 which lead into slip rings 201 and 202, through brushes 211 and 212 respectively and then to wires 231 and 232 to be received by a temperature control 234' at probe inlet terminals 250. Although the temperature control is considered conventional, in this particular application the Fenwal temperature controller series 560 has been employed. If for example, the temperature at probe 80 is below set temperature, a voltage will be applied at the control terminals 251 of the control 234. This voltage is applied over wires 236 and 237 to the coil of the magnetic contactor 235 through an auxiliary control 400 (which will be explained hereinafter). The contactor coil closes the contacts 238 and electrical power flows through the cartridge heaters 13. When the probe signals the controller that the set temperature is reached, the controller cuts off the power to the coil in the magnetic contactor 235 and the cartridge heaters 13 stop heating.

Auxiliary temperature control 400, as shown in FIG. 11 allows the eight bank 82 to operate at two selected temperature ranges. It is conventional in nature and the circuitry to be described is for example only. Current from the controller 234' is applied at terminals 251 to wires 236 and 237. The current in wire 237 may take one of two paths, either through resistor 413 (412, 413, 414, 411, 409, 237) or through resistor 416 (415, 416, 417, 409, 237). Resistors 413 and 416 serve to place a different resistance in the circuit wire 237 which allows a different current to be applied to the bus 83. If resistor 413 is low and 416 high, the current through 83 will be higher when switch 409 contacts terminal 411. Thus, whether resistor 413 or 416 is in the circuit depends upon the position of switch 409. The control circuitry for switch 409 is represented by 401 and includes a normally closed spring biased contact element 409, normally closed terminal 411, open terminal 402, solenoid 402 (409, 410, 411 and 402 comprise a relay), wire 408, power source 407, control elements 404, 405, cam 406 and wire 403. When cam 406 closes contacts 404, 405, solenoid 402 is energized. This also energizes a hold circuit 404' which keeps the solenoid 402 energized for the desired period of time. Cam 406 is also shown at FIG. 12A and may be fixed on shaft 22 in a position shown by 73 at FIG. 4.

Referring back to FIG. 10, a duplicate control 264 (which is the same as control 234') is used for sixteen bank of cartridges 82', which is composed of sixteen cartridges 13 connected in parallel to bus bars 84 and 84' which are then connected by wires 225 and 226 to slip rings 205 and 206. Brushes 215 and 216 contact these rings and then connect to wires 235 and 236 which in turn connect to a magnetic contactor 275 which is identical with magnetic contactor 235 hereinabove described. The voltage source which connects to wires 235 and 236 appears over wires 241 and 236 which also connect to wires 281 and 282 of the voltage source 280. When the contact elements 272 of magnetic contactor 275 are closed, the voltage source 280 is connected to bus bars 84 and 84'. When the temperature probe 81 senses a temperature which is at or above the set point the controller 264 de-energizes the coil of the magnetic contactor 275 which serves to open contact elements 272 and no power flows to the cartridges 13. If the temperature which is sensed by probe terminal 81 is too low, the controller will close contact elements 272 and electrical power will flow to heat cartridges 13. For convenience motor 65 which drives the system and which has been shown at FIG. 5 is connected to the voltage source 280 by means of wires 281, 282 and 283 which eventually connect with wires 301, 300 and 302.

The operation of this machine and method may be best explained by referring to FIGS. 12A–12D. Referring to FIG. 12A the system is shown at a $P_0$ position in which the uncured belt 15 positioned over drum 12 and having the pressure assembly 32 pressing the heat resistant pressure band 16 against the belt 15 into the respective mold cavities. The bank of eight heaters 82 is shown at the left side of the drum while the sixteen heater bank 82' is at the right side. Each bank is independently controlled at its particular set temperature. As shown the belt portion which lies over the circumference of the drum 12 may be considered at $P_0$–$P_1$ and is placed adjacent to the eight heaters. The belt portion $P_3$–$P_0$ is of similar length as portion $P_0$–$P_1$ and will occupy the position that $P_0$–$P_1$ occupies when $P_0$ reaches $P_1$. In the initial condition, the eight heater cartridge 82 is maintained at a relatively low temperature of about 150° which is not sufficient to fully cure the portion of the belt $P_0$. It is important to recognize that at the beginning this portion of the drum could not be maintained at a temperature which would be sufficient to effect a cure because certain portions of the belt that would appear in the region now occupied by $P_0$–$P_1$ would not remain in contact with the drum for the same length of time. That is, the portion of the belt just to the left of $P_1$ would only be in contact with the drum for a short period of time and if that portion would be in an atmosphere having a very high temperature for just a short period of time the cure would be not only discontinuous but the belt might blister and cause other weaknesses. Therefore the temperature of heater 82 is maintained below the temperature necessary to cure the belt. During the initial position the sixteen heaters of bank 82' are maintained at the full cure temperature which may be approximately 320°. This temperature is maintained constant throughout the curing cycle but it is to be noted that the temperature of the eight heater section will be changed.

As the drum rotates counter clockwise the portion of the belt $P_3$–$P_0$ comes in contact with the sixteen heater bank 82'. This portion of the belt receives the full cure which is shown at FIG. 12B. The belt then has a portion $P_0$–$P_1$ which is not fully cured and a portion $P_3$–$P_0$ which is cured. At the time $P_3$ reaches the position formerly occupied by $P_0$ or at the time $P_0$ reaches the position formerly occupied by $P_1$, the temperature control setting of the eight heater bank 82 is increased to the same setting as the controller of the sixteen heater bank 82' because the cam 406 actuates the auxiliary control circuit 401 (FIG. 11). The eight bank of heaters 82 is now maintained at the same temperature as the sixteen bank 82'.

Referring to FIG. 12C, the belt has traversed so that the point $P_3$ now occupies the position formerly occupied by $P_0$ and the belt is in such a position that the region from $P_1$ to $P_4$ is uncured. The belt continues to traverse and the region $P_1$–$P_4$ is cured in the same manner as the region $P_3$–$P_1$. Now the region $P_0$ to $P_1$ which had previously not been fully cured traverses the drum which is now maintained at the full curing temperature of approximately 320° and the portion $P_0$–$P_1$ now receives the full cure. Therefore the total length of the belt which traverses the drum is equal to the length of the belt plus the length of the belt portion $P_0$–$P_1$.

It may be preferable to allow the drum to be uniformly heated throughout the entire curing cycle. This may be accomplished by by-passing auxiliary control 400 or by eliminating it from the circuit. However, the region of the belt $P_0$–$P_1$ will be subjected to the high curing temperature, but will not completely be cured because of the short time the rubber particles closest to $P_1$ are subjected to the curing temperature. On the other hand, inasmuch as the rubber particles are in a heated uncured state, blistering will result unless the environment to which the semi cured region emerges is controlled so as to effect rapid cooling. It may be noted, that when the process operates with auxiliary control 400 in circuit, the environment is automatically controlled because the temperature to which $P_0$—$P_1$ is subjected is much lower than the curing temperature. As this temperature (primarily the effect of the temperature of 82) increases, external means are necessary to supply a blast of cooled air to the belt as it emerges into the environment. Such cooling means shown as 401A at FIG. 12A can be any of conventional devices, but a flow of cooled air through a repeating apertured tube, the apertures facing the belt as it emerges, is satisfactory. Once the semi cured region $P_0$–$P_1$ emerges, the control of the temperature of the environment is eliminated.

Having thus described my invention, what I claim and desire to protect by Letters Patent is:

1. The method of curing endless belts while said belts are in motion comprising the steps of entraining an uncured belt over a rotatable drum having a mold cavity in the periphery thereof, applying tension to said belt by entraining it over a spaced aligned rotatable element, applying pressure continuously by a rotatable non-conductive heat resistant elastomeric band in a radially inward manner against the portion of said belt in contact with said drum, heating the surface of said drum, rotating said drum and said belt, applying heat to the portion of said belt initially in contact with said drum, the heat applied to said portion being insufficient to cure said portion, said portion being thereby only semi-cured in a graduated state descending in the direction of rotation of said portion, rapidly cooling said portion as it emerges from said drum, passing the remaining portion of said belt over said drum, and again passing said semi-cured portion over said drum to effect a complete cure thereof.

2. The method of claim 1 wherein said cooling step is accomplished by supplying a blast of cool air to said portion as it progressively emerges from said drum.

3. A process for curing endless belts comprising the steps of entraining an uncured belt over a rotatable drum having mold cavities in the periphery thereof, maintaining tension on said belt by entraining it also over a rotatable element aligned with said drum and spaced apart with respect thereto, the axes of said drum and said element being approximately parallel, applying pressure continuously by a rotatable nonconductive heat resistant elastomeric band in a radially inward manner against the portion of said belt in contact with said drum, heating the surface of said drum, rotating said drum and said belt while said heat is being applied whereby the regions of said belt successively emerging from contact with said drum are not completely cured but contain sufficient heat so that curing could normally proceed to completion after each of said successive regions cease to contact said drum, rapidly cooling the portion of said belt initially in contact with said drum as it progressively emerges from said drum whereby said portion remains semi-cured in a graduated state descending in the direction of rotation of said portion, passing the remaining portions of said belt over said drum without cooling said remaining portions as they emerge from said drum, and again passing said semi-cured portion over said drum to effect a complete cure thereof.

4. An apparatus for curing endless belts comprising a drum rotatably mounted on a rigid platform, means for supplying heat to the internal peripheral surface of said drum, said heat being sufficient to cure a belt, at least one circumferential mold cavity in the external peripheral surface of said drum for receiving an uncured belt, means spaced from said drum for rotatably supporting and tensioning said belt, an endless resilient non-conductive heat resistant elastomeric band mounted adjacent to said drum for pressing against a portion of said external surface and a portion of said endless belt in said mold cavity, means for rotating said drum, and means for rapidly cooling a selected portion of said belt as said belt portion emerges from between said drum and said band to thereby halt the curing of said portion.

5. The apparatus of claim 4 wherein said band comprises a relatively soft compressible rubber material and said cooling means comprises a blast of cool air.

6. The apparatus of claim 5 wherein said rubber material is butyl rubber.

References Cited in the file of this patent

UNITED STATES PATENTS

| | | |
|---|---|---|
| 2,093,922 | Meyer | Sept. 21, 1937 |
| 2,109,190 | Coffey | Feb. 22, 1938 |
| 2,110,076 | Bierer | Mar. 1, 1938 |
| 2,142,971 | Bierer | Jan. 3, 1939 |
| 2,142,972 | Bierer | Jan. 3, 1939 |
| 2,240,251 | Baker et al. | Apr. 29, 1941 |
| 2,292,290 | Robins | Aug. 4, 1942 |
| 2,526,318 | Battin | Oct. 17, 1950 |
| 2,597,790 | Gorecki | May 20, 1952 |
| 2,599,046 | Brucker | June 3, 1952 |
| 2,865,047 | Mason | Dec. 23, 1958 |
| 2,883,701 | Sauer | Apr. 28, 1959 |
| 2,890,484 | Johnson | June 16, 1959 |